(12) United States Patent
Iwase

(10) Patent No.: US 11,543,077 B2
(45) Date of Patent: Jan. 3, 2023

(54) PRESSURE VESSEL

(71) Applicant: YACHIYO INDUSTRY CO., LTD., Saitama (JP)

(72) Inventor: Wataru Iwase, Saitama (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/287,753

(22) PCT Filed: Oct. 4, 2019

(86) PCT No.: PCT/JP2019/039406
§ 371 (c)(1),
(2) Date: Apr. 22, 2021

(87) PCT Pub. No.: WO2020/085054
PCT Pub. Date: Apr. 30, 2020

(65) Prior Publication Data
US 2021/0310615 A1  Oct. 7, 2021

(30) Foreign Application Priority Data
Oct. 23, 2018  (JP) .............................. JP2018-199016

(51) Int. Cl.
*F17C 1/06* (2006.01)
(52) U.S. Cl.
CPC ........ *F17C 1/06* (2013.01); *F17C 2201/0109* (2013.01); *F17C 2203/012* (2013.01);
(Continued)

(58) Field of Classification Search
CPC ................ F17C 1/06; F17C 2203/0624; F17C 2203/0604
See application file for complete search history.

(56) References Cited

U.S. PATENT DOCUMENTS

| | | | |
|---|---|---|---|
| 2016/0354970 A1* | 12/2016 | Taki | ...................... B29C 53/602 |
| 2017/0219165 A1* | 8/2017 | Takemoto | ............... B29C 70/86 |
| 2017/0241591 A1 | 8/2017 | Nishibu et al. | |

FOREIGN PATENT DOCUMENTS

| | | |
|---|---|---|
| JP | 2001-021099 A | 1/2001 |
| JP | 2006-307947 A | 11/2006 |

(Continued)

OTHER PUBLICATIONS

International Search Report and Written Opinion of the International Search Report for PCT/JP2019/039406 dated Oct. 29, 2019.

(Continued)

*Primary Examiner* — Stephen J Castellano
(74) *Attorney, Agent, or Firm* — Kenealy Vaidya LLP

(57) ABSTRACT

A pressure vessel can include a liner having a cylindrical section and a pair of dome sections; and a reinforcement layer constituted by a fiber-reinforced resin material and formed on the outside of the liner. The pressure vessel's reinforcement layer can include protruding sections formed so as to protrude at the dome sections by high-angle helical winding; and a central section formed by hoop winding which spans the area between each peak of the pair of protruding sections, or by approximate hoop winding in which winding is carried out at a higher angle than the high-angle helical winding.

2 Claims, 4 Drawing Sheets

(52) U.S. Cl.
CPC .......... *F17C 2203/0604* (2013.01); *F17C 2203/0624* (2013.01); *F17C 2203/0673* (2013.01); *F17C 2221/012* (2013.01); *F17C 2221/035* (2013.01)

(56) References Cited

FOREIGN PATENT DOCUMENTS

| | | |
|---|---|---|
| JP | 2011-163354 A | 8/2011 |
| JP | 2012-246962 A | 12/2012 |
| JP | 5408351 B2 | 2/2014 |
| JP | 2017-145962 A | 8/2017 |
| WO | 2016/020972 A1 | 5/2017 |
| WO | 2018/066293 A1 | 4/2018 |
| WO | 2020/085054 A1 | 4/2020 |

OTHER PUBLICATIONS

International Preliminary Report on Patentability for PCT/JP2019/039406 dated Mar. 17, 2020.
The extended European Search Report for the related European Patent Application No. 19876146.2 dated Jun. 29, 2022.

* cited by examiner

PRESSURE VESSEL

CROSS-REFERENCE TO RELATED APPLICATIONS

This application is a U.S. National Stage Application under 35 U.S.C § 371 of International Patent Application No. PCT/JP2019/039406 filed 4 Oct. 2019, which claims the benefit of priority to Japanese Patent Application No. 2018-199016 filed 23 Oct. 2018, the disclosures of all of which are hereby incorporated by reference in their entireties.

TECHNICAL FIELD

The present invention relates to a pressure vessel.

BACKGROUND ART

There is known a pressure vessel including a liner that has a cylindrical section and paired dome sections formed on both sides of the cylindrical section and a reinforcement layer that is formed outside the liner and that is made of a fiber reinforced resin material (for example, see Patent Literatures 1 and 2).

The reinforcement layer is generally formed by filament winding method. Hoop winding is a winding method in which fiber reinforcement members 30 are wound in a direction substantially orthogonal to the axis O of a pressure vessel 31 as illustrated in FIG. 4A. Low-angle helical winding is a winding method in which the fiber reinforcement members 30 are wound at a low orientation angle θ2 with respect to the axis O as illustrated in FIG. 4B. High-angle helical winding is a winding method in which the fiber reinforcement members 30 are wound at a high orientation angle θ1 with respect to the axis O as illustrated in FIG. 4C. Generally, the hoop winding is performed to reinforce a cylindrical section 32 and the low-angle helical winding is performed to reinforce portions around distal ends of dome sections 33. In many cases, the high-angle helical winding is performed to mainly reinforce sections that cannot be sufficiently reinforced by the hoop winding or the low-angle helical winding, specifically shoulder sections 35 that are sections of the dome sections 33 close to the cylindrical section 32.

Patent Literature 2 describes a technique in which the hoop winding is applied to reinforce shoulder sections. Specifically, Patent Literature 2 describes a technique in which a hoop layer is formed in end portions of a cylindrical section of a liner to be extended surfaces of the shoulder sections. Specifically, hoop dome sections of the hoop layer are designed as a structure that serves as part of the shoulder sections of the liner.

CITATION LIST

Patent Literature

Patent Literature 1: Japanese Patent Application Publication No. 2012-246962
Patent Literature 2: Japanese Patent No. 5408351

SUMMARY OF INVENTION

Technical Problem

However, in the technique of Patent Literature 2, the hoop dome sections of the hoop layer are formed to be the extended surfaces of the shoulder sections. Specifically, the hoop dome sections of the hoop layer have a structure in which the thickness decreases toward the distal ends of the dome sections of the liner. Accordingly, the strength of the reinforcement in the shoulder sections gradually decreases toward the distal ends of the dome sections of the liner.

The present invention has been created to solve the aforementioned problem and an object is to provide a pressure vessel that can achieve suppression of a decrease of strength in dome sections of a liner.

Solution to Problem

In order to solve the aforementioned problem, the present invention is a pressure vessel comprising: a liner including a cylindrical section and paired dome sections; and a reinforcement layer formed outside the liner and made of a fiber reinforced resin material, wherein the reinforcement layer includes: bulging sections formed respectively in the dome sections by high-angle helical winding to bulge; and an intermediate section formed across a portion between vertices of the paired bulging sections by hoop winding or near-hoop winding in which winding is performed at a higher angle than the high-angle helical winding, and each of the bulging sections are formed in a mountain shape locally having an increased thickness by winding strands such that the strands overlap one another in a circumferential direction.

According to the present invention, the following effects can be obtained.

(1) The bulging sections having large thickness due to the high-angle helical winding can sufficiently locally reinforce the dome sections. Since the shape of the liner can be the simple dome shape, it is possible to suppress concentration of stress and suppress effects of an inner fluid that may occur due to provision of no specific large-thickness sections in the liner.

(2) Since the reinforcement layer includes the intermediate section formed across the portion between the vertices of the paired bulging sections by the hoop winding or the near-hoop winding in which the winding is performed at a higher angle than the high-angle helical winding, steps formed by the formation of the bulging sections can be eliminated. This can suppress swelling of an outer layer and suppress a decrease in the strength of the pressure vessel.

Moreover, in the present invention, the intermediate section is formed to first extend from the vertex of each of the bulging sections in a curved surface shape, and the intermediate section is adjacent to a tilted surface of the bulging section on the outer side in an axial direction and formed to then extend parallel to the axial direction of the liner.

According to the present invention, the steps of the bulging sections can be eliminated in a simple structure.

Advantageous Effects of Invention

The present invention can achieve suppression of a decrease of strength in the dome sections of the liner.

BRIEF DESCRIPTION OF DRAWINGS

FIG. 4A illustrates hoop winding, FIG. 4B illustrates low-angle helical winding, and FIG. 4C illustrates high-angle helical winding.

DESCRIPTION OF EMBODIMENTS

Figure 1:
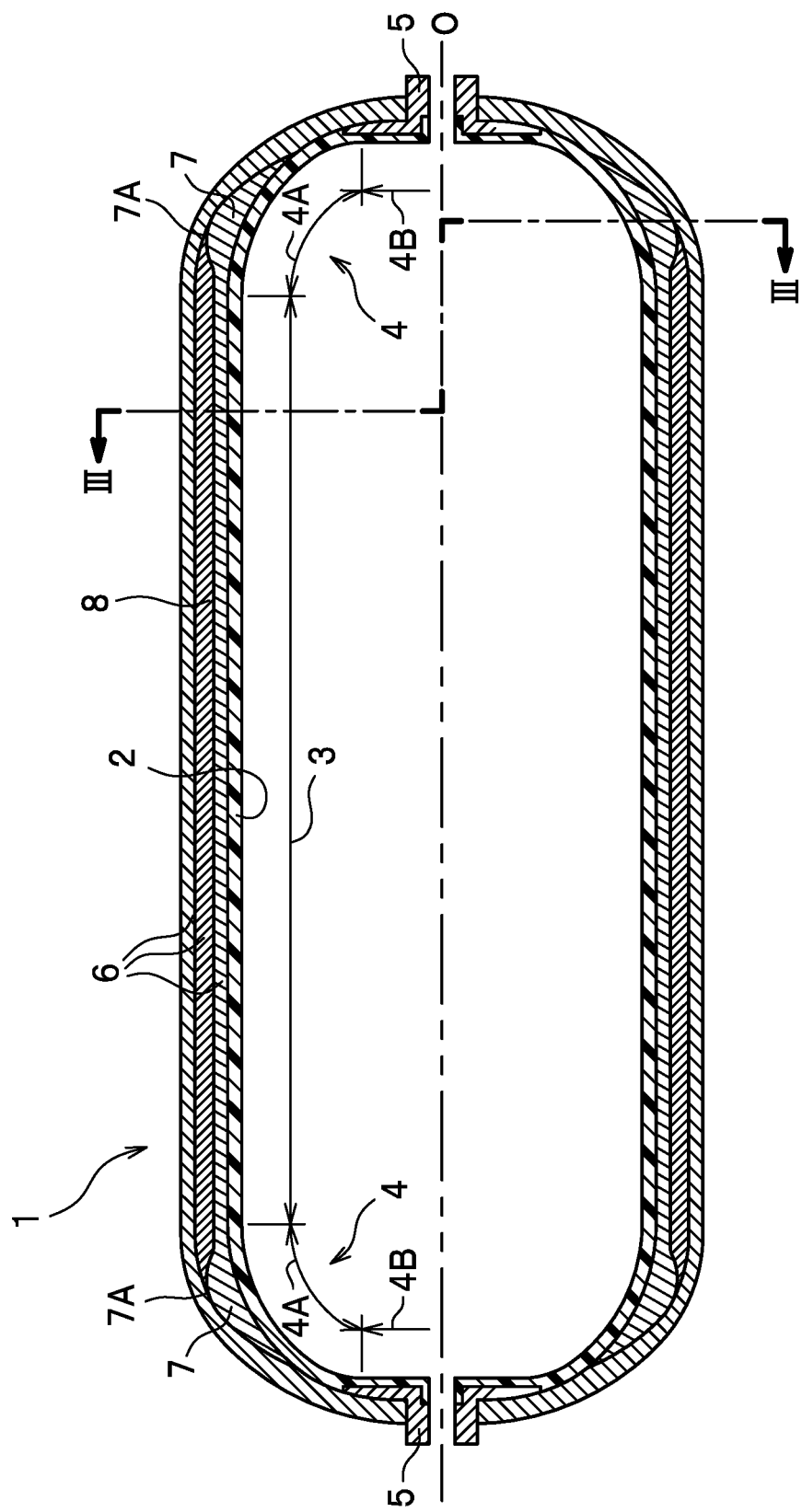
FIG. 1 is a side cross-sectional view of a pressure vessel according to the present invention.

A pressure vessel of the present invention can be applied as a vessel that stores a low-pressure gas such as LPG, a high-pressure gas such as hydrogen gas, and other fluids. As illustrated in FIG. 1, the pressure vessel 1 of the present invention includes a liner 2 and a reinforcement layer 6 formed outside the liner 2 by filament winding and made of a fiber reinforced resin material.

The liner 2 includes a cylindrical section 3 having a cylindrical shape with a substantially constant cross section and dome sections 4, 4 formed at both ends of the cylindrical section 3. A metal boss 5 is integrally molded with the liner 2 at the center of a flat surface section 4B of at least one dome section 4 to be coaxial with an axis O of the liner 2. The liner 2 is made of a synthetic resin material such as, for example, polyethylene and is formed by injection molding, blow molding, or the like.

Each dome section 4 has a shape including a shoulder section 4A that has a curved shape with a decreasing diameter from an end portion of the cylindrical section 3 and the flat surface section 4B that is formed on a distal end side of the shoulder section 4A and that forms a surface substantially orthogonal to the axis O. The configuration may be such that no flat surface section 4B is formed and a section from the end portion of the cylindrical section 3 to the boss 5 is formed to have a curved shape with a decreasing diameter.

The reinforcement layer 6 is formed by winding strands, made of bundles of reinforcement fibers, on an outer surface of the liner 2 rotated about the axis O by a not-illustrated rotating apparatus. The reinforcement layer 6 includes bulging sections 7 that are formed in the shoulder sections 4A of the respective dome sections 4 by high-angle helical winding to bulge and an intermediate section 8 that are formed across a portion between vertices 7A of the paired bulging sections 7 by hoop winding or near-hoop winding in which the strands are wound at a higher angle than the high-angle helical winding.

Figure 4A:
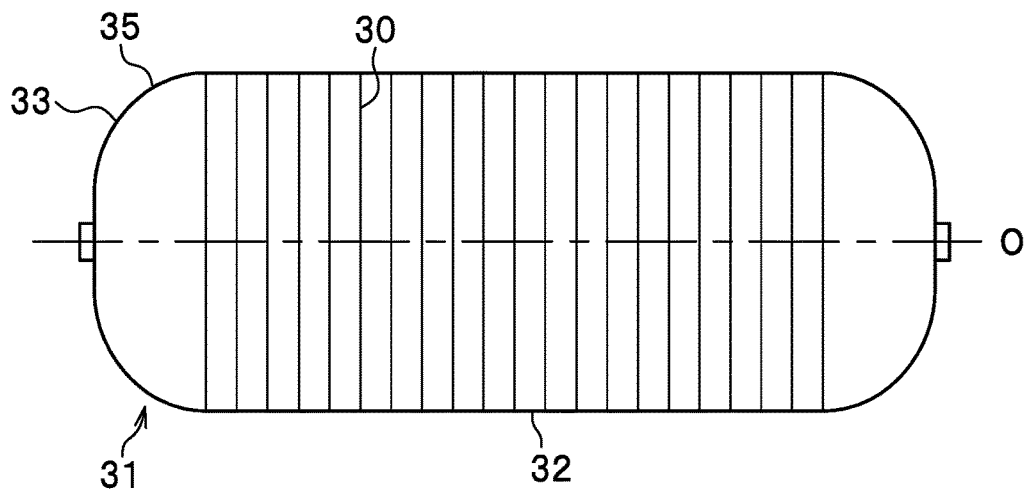
FIGS. 4A to 4C are schematic explanation views of filament winding methods.
Figure 4B:
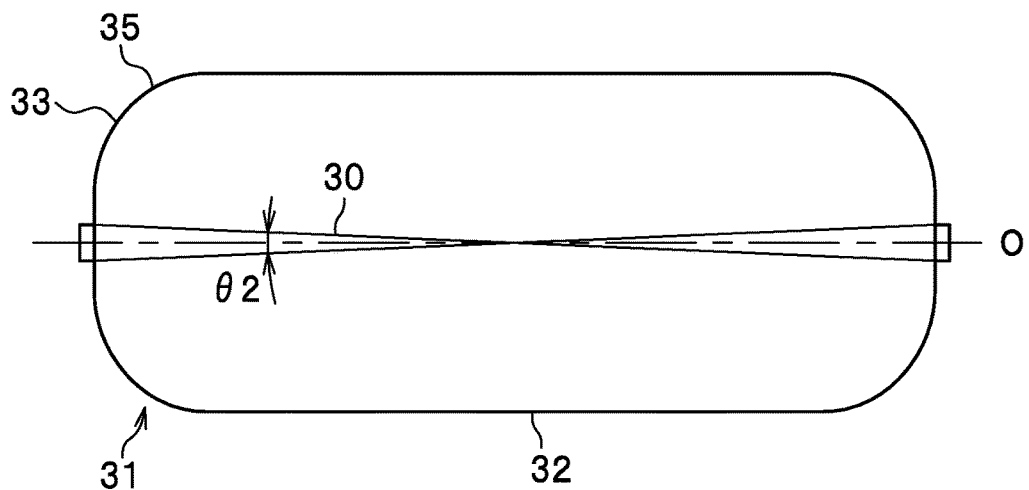
Figure 4C:
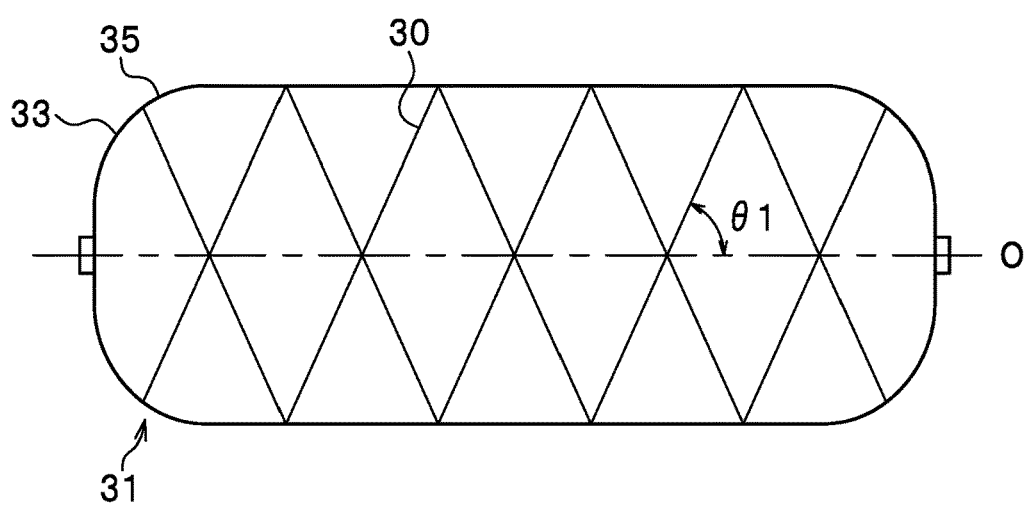

The hoop winding is a winding method in which the strands are wound in a direction substantially orthogonal to the axis O of the pressure vessel as described in FIG. 4A. The high-angle helical winding is a winding method in which the strands are wound at a high orientation angle θ1 with respect to the axis O as described in FIG. 4C. The low-angle helical winding is a winding method in which the strands are wound at a low orientation angle θ2 with respect to the axis O as described in FIG. 4B. The orientation angle θ1 of the high-angle helical winding is within a range of about 65° to 75° with respect to the axis O. The orientation angle θ2 of the low-angle helical winding is about a minimum angle at which the strands can be wound around the boss 5 or higher and 15° or lower.

"Bulging Sections 7"

Figure 3:
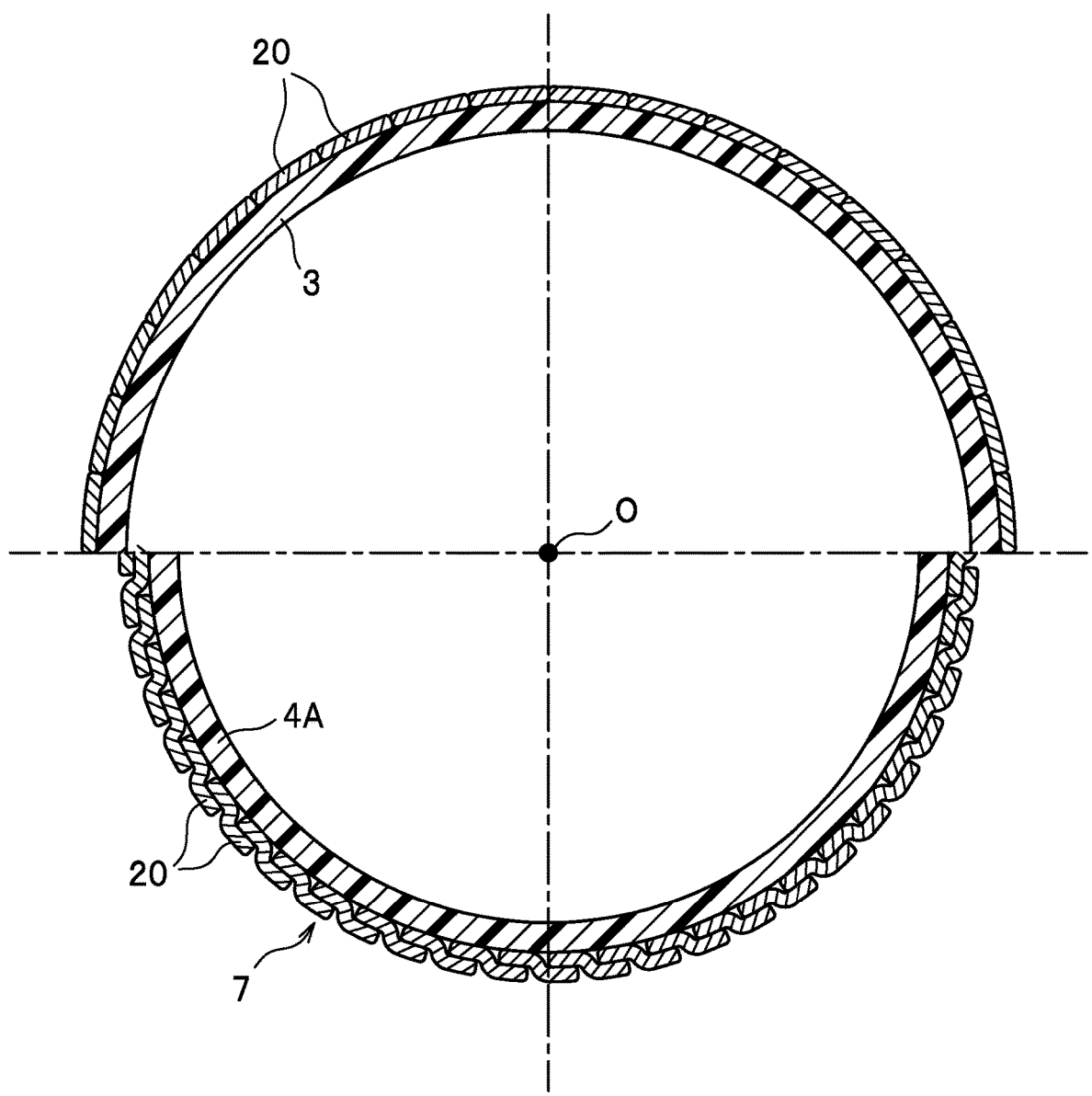
FIG. 3 is a cross-sectional view taken along the line in FIG. 1.

In the embodiment, the high-angle helical winding is performed on the surfaces of the cylindrical section 3 and the shoulder sections 4A of the liner 2. As illustrated in FIG. 3, since the diameter dimension of each shoulder section 4A is smaller than the diameter dimension of the cylindrical section 3, the strands 20 are wound to overlap one another in a circumferential direction in the shoulder section 4A when the strands 20 are wound adjacent to one another while being tightly packed in the cylindrical section 3. Thus, the thickness in a radial direction increases by an amount corresponding to this overlapping and the mountain-shaped bulging section 7 is formed in each shoulder section 4A.

Figure 2:
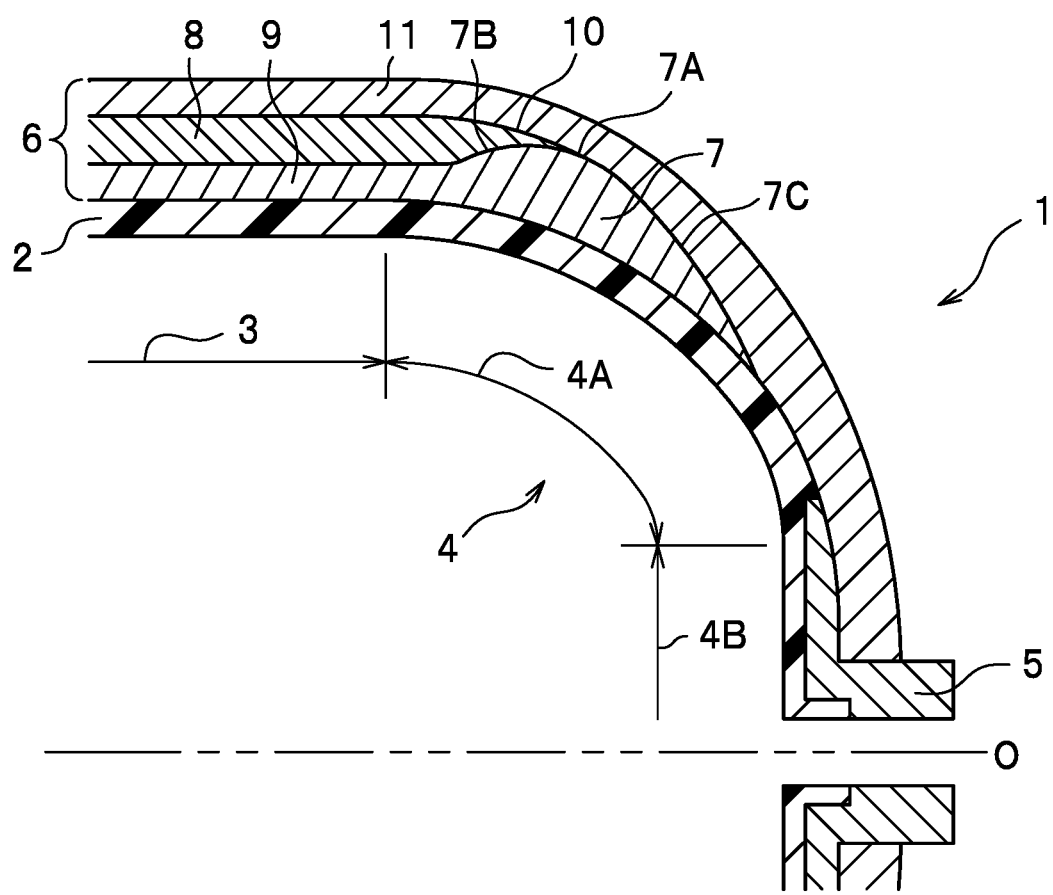
FIG. 2 is a side cross-sectional view around a bulging section according to the present invention.

In FIG. 2, the shoulder section 4A is tilted in a curved shape. Accordingly, if the viscosity of an impregnation resin material for the strands is low, the strands slip while being wound on the shoulder section 4A. Gaps thereby open and the strands cannot be densely wound. Thus, a high-viscosity impregnation resin material with predetermined viscosity or higher is preferably used as the impregnation resin material for the strands. As a result of tests performed by the present inventors by using an impregnation resin with high viscosity, it was found that the strands could be densely wound on the surfaces of the shoulder sections of the liner 2 with almost no slipping. However, when the thickness of the strands gradually increases, the slipping is more likely to occur in an outer portion of the strands in the radial direction. Accordingly, the shape of each bulging section 7 is a mountain shape including tilted surfaces 7B, 7C that have gradually-curving surface shapes and that are nearer respectively to the cylindrical section 3 and the flat surface section 4B in relation to the vertex 7A with the vertex 7A being the most bulging point. In the embodiment, the lengths of the tilted surfaces are such that the tilted surface 7C is longer than the tilted surface 7B. Note that the bulging section 7 may be formed by, for example, changing the orientation angle θ1 of the high-angle helical winding, the rotation speed of the liner 2, and the like.

"Intermediate Section 8"

The intermediate section 8 is a layer that is formed across the portion between the paired vertices 7A by the hoop winding or the near-hoop winding in which the strands are wound at least at a higher angle than the orientation angle θ1 of the high-angle helical winding in the bulging sections 7, and is formed outside a high-angle helical layer 9 formed on the surface of the cylindrical section 3 and outside the tilted surfaces 7B of the bulging sections 7. No step is thus formed between the intermediate section 8 and the vertex 7A of each bulging section 7 and the bulging section 7 and the intermediate section 8 are smoothly connected each other.

As illustrated in FIG. 2, the shape of the surface of the intermediate section 8 connected to the vertex 7A is formed to first extend from the vertex 7A in a curved surface shape to be an extended surface 10 of the tilted surface of the bulging section 7 on the outer side in the axis O direction, that is the tilted surface 7C and is formed to then extend parallel to the axis O direction. The bulging section 7 and the intermediate section 8 can be thereby smoothly connected to each other.

An outer layer 11 wound in at least one of the hoop winding, the low-angle helical winding, and the high-angle helical winding is formed outside the bulging sections 7 and the intermediate section 8. Generally, the outer layer 11 is formed of a mixed layer of the hoop winding and the low-angle helical winding. However, in the present invention, the winding method of the outer layer 11 is not limited to a particular method. As can be seen from FIG. 1, the thickness of the outer layer 11 between the paired vertices 7A is substantially constant.

The following effects can be obtained in the configuration in which the reinforcement layer 6 includes the bulging sections 7 that are formed in the respective dome sections 4 by the high-angle helical winding to bulge and the intermediate section 8 that is formed across the portion between the vertices 7A of the paired bulging sections 7 by the hoop winding or the near-hoop winding in which the strands are wound at a higher angle than the high-angle helical winding.

(1) The bulging sections 7 having large thickness due to the high-angle helical winding can sufficiently locally reinforce the dome sections 4. Since the shape of the liner 2 can be the simple dome shape, it is possible to suppress concentration of stress and suppress effects of the inner fluid that may occur due to provision of no specific large-thickness sections in the liner 2.

(2) Since the reinforcement layer 6 includes the intermediate section 8 formed across the portion between the vertices 7A of the paired bulging sections 7 by the hoop winding or the near-hoop winding in which the strands are wound at a higher angle than the high-angle helical winding, the steps formed by the formation of the bulging sections 7 can be eliminated. This can suppress swelling of the outer layer 11 and suppress a decrease in the strength of the pressure vessel 1.

The intermediate section 8 is formed to first extend from the vertex 7A in a curved surface shape to be the extended surface 10 of the tilted surface 7C of the bulging section 7 on the outer side in the axis O direction and is formed to then extend parallel to the axis O direction of the liner 2. This can eliminate the steps of the bulging sections 7 in a simple structure.

The preferable embodiment of the present invention has been described above. In the described embodiment, the bulging sections 7 are formed directly on the surfaces of the dome sections 4 of the liner 2, that is the bulging sections 7 are formed as a first inner layer of the reinforcement layer 6. However, for example, the configuration may be such that the first inner layer of the reinforcement layer 6 is formed of another winding layer and the bulging sections 7 are formed on the other winding layer. Moreover, the present invention is not limited to that described in the drawings and various design changes can be made within a scope not departing from the spirit of the present invention.

REFERENCE SIGNS LIST

1 pressure vessel
2 liner
3 cylindrical section
4 dome section
6 reinforcement layer
7 bulging section
8 intermediate section
9 high-angle helical layer
10 extended surface
11 outer layer

The invention claimed is:

1. A pressure vessel comprising:
   a liner including a cylindrical section and paired dome sections; and
   a reinforcement layer formed outside the liner and made of a fiber reinforced resin material, wherein
   the reinforcement layer includes:
     a high-angle helical winding layer including bulging sections formed respectively adjacent to the dome sections by high-angle helical winding to bulge; and
     an intermediate section formed between radially outer side vertices of the paired bulging sections by hoop winding or near-hoop winding in which winding is performed at a higher angle than the high-angle helical winding, wherein
   each of the bulging sections are formed in a mountain shape in such a manner that a thickness of a thicker part of the bulging sections is greater than a thickness of a thinner part of the bulging sections by winding strands such that the strands overlap one another in a circumferential direction in greater amount in the thicker part of the bulging sections than in the thinner part of the bulging sections, and
   a maximum outer diameter of the thicker part of the bulging sections in the high-angle helical winding layer taken perpendicular to a central longitudinal axis of the liner is greater than an outer diameter of the thinner part of the bulging sections taken perpendicular to the central longitudinal axis of the liner, wherein the thinner part is located closer to the intermediate section than the thicker part such that an outer surface of the reinforcement layer is sloped outward and away from the central longitudinal axis of the liner and then is sloped inwards towards the central longitudinal axis of the liner as the bulging sections extend further from the cylindrical section of the liner.

2. The pressure vessel according to claim 1, wherein each of the bulging sections includes:
   a first tilted surface which is provided on an outer side in the liner axial direction with respect to the vertex and is formed to be in a curved shape, wherein the first tilted surface projects toward an outer side in a radial direction of the liner,
   a second tilted surface which is formed to be in a curved shape, wherein the second tilted surface projects toward the outer side in the radial direction of the liner, wherein
   the first and second tilted surfaces are upper surfaces of the bulging section provided in opposed positions with respect to the vertex, wherein
   the intermediate section is formed to be substantially in parallel to the liner axial direction of the liner, and an end of the intermediate section in the liner axial direction of the liner is provided with a curved surface part which is continuously curved with the first tilted surface, and wherein
   the curved surface part is provided on an upper surface of the intermediate section.

\* \* \* \* \*